United States Patent
Maionchi et al.

(10) Patent No.: US 7,890,469 B1
(45) Date of Patent: Feb. 15, 2011

(54) FILE CHANGE LOG

(75) Inventors: Joseph M. Maionchi, Vallejo, CA (US);
John A. Colgrove, Los Altos, CA (US);
Craig K. Harmer, San Francisco, CA (US)

(73) Assignee: Symantec Operating Corporation, Mountain View, CA (US)

( * ) Notice: Subject to any disclaimer, the term of this patent is extended or adjusted under 35 U.S.C. 154(b) by 698 days.

(21) Appl. No.: 10/334,101

(22) Filed: Dec. 30, 2002

(51) Int. Cl.
*G06F 7/00* (2006.01)
*G06F 17/00* (2006.01)
*G06F 12/00* (2006.01)
*G06F 17/30* (2006.01)

(52) U.S. Cl. .................. 707/654; 707/822

(58) Field of Classification Search ............... 707/205, 707/202, 201, 204, 1, 9, 8; 714/15; 711/162
See application file for complete search history.

(56) References Cited

U.S. PATENT DOCUMENTS

| | | | |
|---|---|---|---|
| 6,067,541 A | 5/2000 | Raju et al. | 707/3 |
| 6,189,016 B1 | 2/2001 | Cabrera et al. | 707/203 |
| 6,389,427 B1 * | 5/2002 | Faulkner | 707/104.1 |
| 6,732,124 B1 * | 5/2004 | Koseki et al. | 707/202 |
| 6,892,377 B1 * | 5/2005 | White | 717/116 |
| 2003/0144990 A1 * | 7/2003 | Benelisha et al. | 707/1 |

OTHER PUBLICATIONS

Yu et al., "Java/DSM: A platform for heterogeneous computing", Concurrency: Practice and Experience, vol. 9(11), pp. 1213-1224, Nov. 1997; John Wiley & Sons, Ltd.*

Microsoft, ("Use Access Control to Restrict Who Can Use Files", http://www.microsoft.com/windowsxp/using/security/learnmore/accesscontrol.mspx; Published Aug. 24, 2001, Accessed Sep. 9, 2005.*

Back et al., "Techniques for the Design of Java Operating Systems", Proceedings of the USENIX Annual Technical Conference, Jun. 2000.*

Nikander, "An operating system in Java for the Lego Mindstorms RCX microcontroller", Proc. of 2000 USENIX Annual Technical Conference, Freenix Session, Jun. 18-23, 2000.*

D. Kawamoto, CNET News.com, "Google Tests Tool to Aid Web Indexing," Jun. 6, 2005, http://www.zdnetasia.com/toolkits/0,39045920,39234713-107q,00.htm (printed Aug. 30, 2005).

Platform SDK: Indexing Service, "What is Indexing Service?" Platform SDK Release: Feb. 2003, pp. 1-2, http://msdn.microsoft.com/library/en-us/indexsrv/html/ixintro_0311.asp?frame=true (printed Aug. 30, 2005).

S. Green, Sun Microsystems Laboratories, White Paper: Advanced Search Technology. "Sun's Advanced Search Technology Gives Portal and Web Server Products a Competitive Advantage," Jan. 21, 2004, pp. 1-17.

* cited by examiner

*Primary Examiner*—Michael J Hicks
(74) *Attorney, Agent, or Firm*—Campbell Stephenson LLP

(57) ABSTRACT

A method, system, and computer program product are provided to update file change log data to indicate that a change to a file in a file system has occurred. The file change log data are accessible for read access using a file system-independent operating system function. Applications can read, open, close, and seek data in the file change log using file system-independent operating system functions. The file change log data can be read by multiple applications simultaneously, even when data are being written to the file change log. Operations such as writing data to the file change log and renaming or deleting the file change log file itself are prevented when performed by an application rather than the file system. These prohibitions protect the file change log.

21 Claims, 9 Drawing Sheets

Process File System Operation

Process Change
To File

FIG. 5 Write Transaction To File Change Log

Determine Whether To Log Operation

Check Update Interval

Application Calls Log_Sync

| Event | FCL sync count | F1 sync count | F2 sync count | FCL Updates |
|---|---|---|---|---|
| 9.1 Boot system | 0 | | | |
| 9.2 Activate FCL | 0 | | | |
| 9.3 Create F1 | 0 | 0 | | |
| 9.4 Create F2 | 0 | 0 | 0 | |
| 9.5 log_sync is called | 1 | 0 | 0 | |
| 9.6 data written to F1, F1 sync count updated | 1 | 1 | 0 | Write data change record to FCL |
| 9.7 log_sync is called | 2 | 1 | 0 | |
| 9.8 data written to F2, F2 sync count updated | 2 | 1 | 2 | Write data change record to FCL |
| 9.9 data written to F2, F2 sync count not updated because FCL sync count = F2 sync count | 2 | 1 | 2 | If FCL write interval has elapsed, write data change record to FCL If FCL write interval has not elapsed, do not write data change record to FCL |
| 9.10 log_sync is called | 3 | 1 | 2 | |

FIG. 9
*Example Scenario*

FILE CHANGE LOG

Portions of this patent application contain materials that are subject to copyright protection. The copyright owner has no objection to the facsimile reproduction by anyone of the patent document, or the patent disclosure, as it appears in the Patent and Trademark Office file or records, but otherwise reserves all copyright rights whatsoever.

BACKGROUND OF THE INVENTION

1. Field of the Invention

The present invention relates to tracking changes to files in a file system.

2. Description of the Related Art

A file system is a set of computer programs that takes ownership of the storage space of a volume or hard disk and uses the storage space to store files, directories, and other file system objects. Files and disk volumes are storage objects in that data in a file or volume persist after a corresponding power supply is deactivated. However, files are more flexible than volumes, and files are often more convenient for storing application data than raw volumes or disks. A file can contain both user data and internal data, called metadata, which are used by the file system to manage the file.

A file system can access file system objects by making a system call through the operating system of the computer system on which the file system resides. Most file systems support a standard set of system calls, such as open, read, and write, that can be used to perform operations on a file.

A file system maintains at least one namespace for file system objects. A namespace is a set or group of names that is defined according to some naming convention.

A flat namespace uses a single, unique name for every device. For example, a small Windows (NetBIOS) network requires a different name to be assigned to each computer and printer. The Internet uses a hierarchical namespace that partitions the names into categories known as top level domains, such as .com and .net, which are at the top of the hierarchy.

Microsoft's NTFS is a recoverable journaling file system that guarantees the consistency of the volume by using standard transaction logging and recovery techniques. NTFS records changes to file system structures in a transaction log. In the event of a disk corruption, NTFS runs a recovery procedure that accesses information stored in the transaction log file. The NTFS recovery procedure guarantees that the volume is restored to a consistent state.

A Change Journal was added as a new feature of NTFS in Windows 2000. The Change Journal provides a persistent log of changes made to files on a volume. NTFS uses the Change Journal to track information about added, deleted, and modified files for each volume. The Change Journal describes the nature of changes to files on the volume. When any file or folder is created, modified, or deleted, NTFS adds a record to the Change Journal for that volume.

The Change Journal is more efficient than time stamps or file notifications for determining changes in a particular namespace. Applications that normally need to scan an entire volume to determine changes can scan the volume once and subsequently refer to the Change Journal. The input/output (I/O) cost depends on the number of files that have changed, not on the number of files that exist on the volume.

Each record in the Change Journal takes approximately 80-100 bytes of space, but a maximum size for the Change Journal can be configured so that the Change Journal does not exceed the maximum size. When the maximum size is reached, the oldest records in the Change Journal are discarded.

The full pathname of a file or directory is not stored in a Change Journal record. Instead, a File Reference Number (FRN) for the parent directory is stored. Each application using the Change Journal is expected to keep an internal database of all directories (and their FRNs) for the file system in order to look up a reference number for the parent directory. An application using the Change Journal initially builds a mapping of directories and file names to FRNs, a time-consuming operation. The application maintains the database with changes described in the Change Journal.

Each record in the Change Journal is identified using an Update Sequence Number (USN) that increases and provides a logical offset into the Change Journal file. Writes to the Change Journal occur in 4 KB blocks (according to a USN_PAGE_SIZE variable). Records cannot span a page boundary, so padding is used when the next record to be added requires more than the remaining space on the page. The Change Journal can be read from the first available record (StartUsn=0), an existing record (StartUsn=USN), or the next record that will be written to the Change Journal (StartUsn=NextUsn).

One Change Journal exists for each NTFS volume (i.e., for the entire file system). The NTFS Master File Table (MFT) marks an entry for a file or directory with the LastUSN used. The Change Journal is a sparse file so that the records at the beginning of the file can be deleted without a significant detrimental effect on performance.

The Change Journal can have one of the following states:
Disabled
Activating
Active
Disabling The Change Journal can be enabled (placed in the active state) or disabled at any time. The default state of the Change Journal is disabled. An application using the Change Journal can enable or disable the Change Journal according to that application's own needs. However, this feature can be problematic if one application disables the Change Journal when another application expects the Change Journal to be enabled. The current implementation of the Change Journal cannot be locked for exclusive use.

Because multiple applications can manipulate the Change Journal, each application using the Change Journal must be capable of handling a change in the Change Journal's state at any time, including the deletion of the Change Journal.

When the Change Journal is disabled, all records are purged to prevent applications from reading unreliable records, and the Change Journal file itself is deleted. Disabling (deleting) the Change Journal sets all LastUsns in the Master File Table to zero, which is a time-consuming operation.

The Master File Table can be read to show the LastUsn for files in a range that may have been purged from the Journal. Data in the MFT indicates to the application that something happened to these specific files, although the records for those changes are gone. Note that reading the MFT does not work for deleted files, as deleted files are no longer in the MFT. In addition, the MFT does not indicate intermediate changes made in the USN range.

While the Change Journal is an improvement over scanning an entire file system for changes, improvements can be made. For example, the Change Journal is a hidden system file that can be accessed only by using a file system-specific Application Program Interface (API). Each application using the Change Journal is pre-configured by adding the appropriate file system-specific API calls. Furthermore, each application using the Change Journal must keep track of File Reference Numbers for each file and directory in the file system so that a full pathname for the file can be specified to access the file or directory. These requirements are burdensome for application programs and may prevent access by remote applications running on different computer systems, also referred to as nodes in a distributed environment. Those nodes may be running different file systems and/or operating systems than the node maintaining the Change Journal. In addition, one application can disable or enable the Change Journal without regard to other applications' need to use the Change Journal.

A solution is needed to enable multiple applications to access a log of changes to files in a file system without the need to scan the entire file system repeatedly. Preferably, enablement and disablement of the log are not controlled by application programs, but by an independent process. In addition, the solution should be accessible from nodes running different file systems than the node maintaining the Change Journal. The solution should also be accessible by applications without using a file system-specific API. The solution should furthermore not burden applications with the task of maintaining their own copies of file system metadata, such as File Reference Numbers, to use the log. The solution should not significantly affect performance of the file system or the operating system.

SUMMARY OF THE INVENTION

The present invention includes a method, system, computer program product, and computer system that track changes to files in a file system in a file change log (FCL). The file change log appears as an ordinary file in the file system namespace for purposes of accessing data in the file change log, such as read operations, and not as a hidden or system file. Consequently, the file change log data are accessible from nodes running different file systems and/or operating systems than the node maintaining the Change Journal. The file change log data are accessible by multiple applications using file system-independent operating system calls. Selected operations to the FCL file itself, such as write operations, are prevented when requested by an application to protect file change log data.

The invention enables multiple applications to access the file change log data to determine whether a file has been changed, without the need to scan the entire file system repeatedly. The entire file system can be scanned initially and, thereafter, the file change log can be used to identify changes. Enablement and disablement of the file change log is not controlled by application programs. Applications are not burdened with the task of maintaining their own copies of file system metadata, such as File Reference Numbers, to use the file change log. The file change log enhances the performance of application programs while not significantly affecting file system or operating system performance.

BRIEF DESCRIPTION OF THE DRAWINGS

The present invention may be better understood, and its numerous objects, features and advantages made apparent to those skilled in the art by referencing the accompanying drawings.

FIG. 9 shows an example scenario of updates to data, the file change log, the FCL sync count, and respective files' sync counts.

The use of the same reference symbols in different drawings indicates similar or identical items.

DETAILED DESCRIPTION

Figure 1:
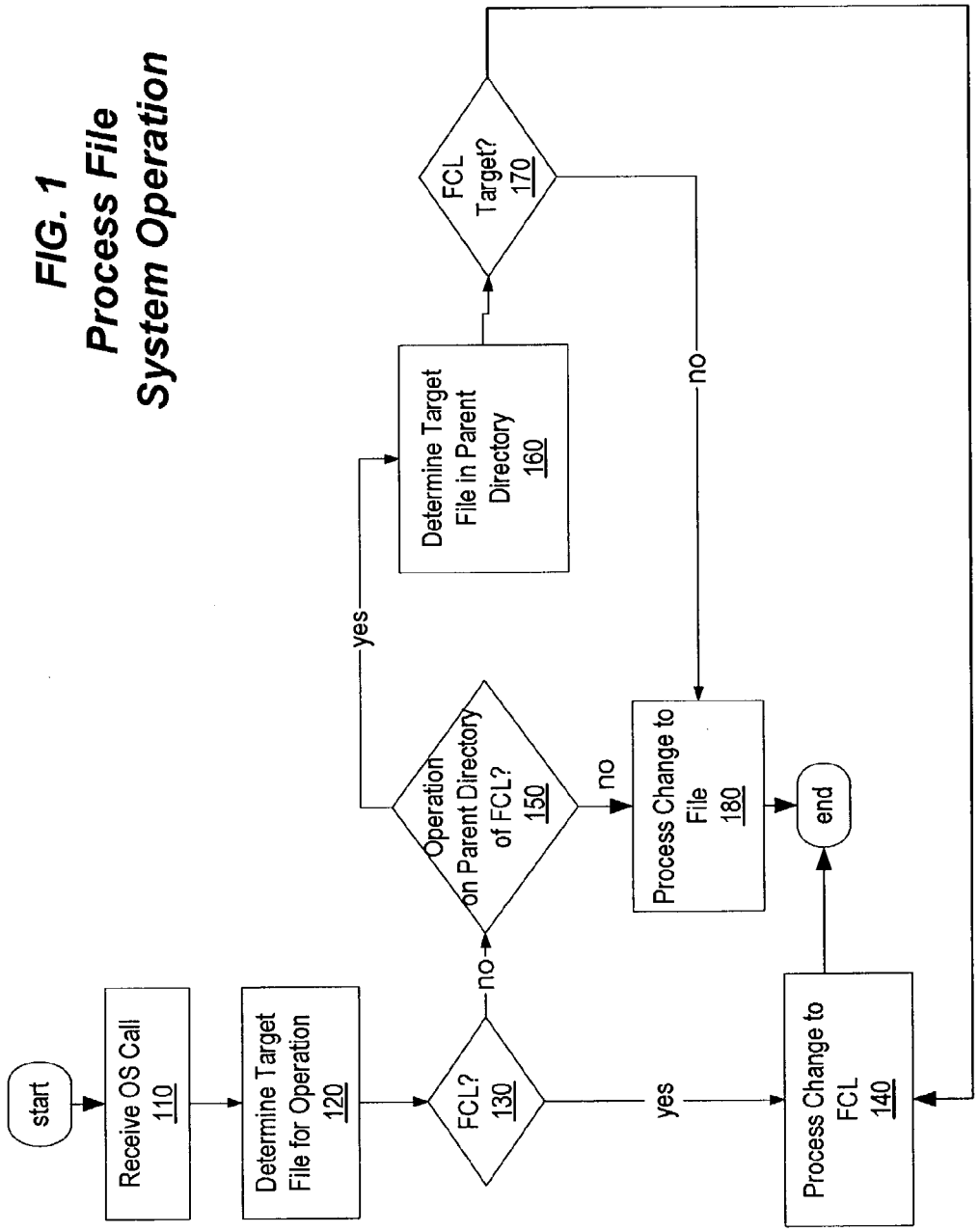
FIG. 1 is a flowchart showing an example of a method for processing of file system operations by a file system.

For a thorough understanding of the subject invention, refer to the following Detailed Description, including the appended Claims, in connection with the above-described Drawings. Although the present invention is described in connection with several embodiments, the invention is not intended to be limited to the specific forms set forth herein. On the contrary, it is intended to cover such alternatives, modifications, and equivalents as can be reasonably included within the scope of the invention as defined by the appended Claims.

In the following description, for purposes of explanation, numerous specific details are set forth in order to provide a thorough understanding of the invention. It will be apparent, however, to one skilled in the art that the invention can be practiced without these specific details.

References in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

INTRODUCTION

The present invention includes a method, system, computer program product, and computer system that track changes to files in a file system in a file change log (FCL). The file change log appears as an ordinary file in the file system namespace for purposes of accessing data in the file change log, such as read operations, and not as a hidden or system file. Consequently, the file change log data are accessible from nodes running different file systems and/or operating systems than the node maintaining the Change Journal. The file change log data are accessible by multiple applications using file system-independent operating system calls. Selected operations to the FCL file itself, such as write operations, are prevented when requested by an application to protect file change log data.

The file change log is designed such that implementation of the file change log does not vary according to the operating system environment in which the file change log is used. In one embodiment, the file change log is implemented in the same way in Solaris, HP-UX, AIX, and Linux environments.

The invention enables multiple applications to access the file change log data to determine whether a file has been changed, without the need to scan the entire file system repeatedly. The entire file system can be scanned initially and, thereafter, the file change log can be used to identify changes. Enablement and disablement of the file change log is not controlled by application programs. Applications are not burdened with the task of maintaining their own copies of file system metadata, such as File Reference Numbers, to use the file change log. The file change log enhances the performance of application programs while not significantly affecting file system or operating system performance.

A method implementing the present invention updates file change log data to indicate that a change to a file has occurred. The file change log data are accessible for read access using a file system-independent operating system function. Applications can read, open, close, and seek data in the file change log using file system-independent operating system functions. The file change log data can be read by multiple applications simultaneously, even when the data are being written to the file change log.

Operations such as writing data to the file change log and renaming or deleting the file change log file itself are prevented when performed by an application rather than the file system. These prohibitions protect the file change log.

The file change log can be used by backup applications to determine the files that have changed, and therefore need to be backed up, since the last backup. Web search engines and indexing services can use the file change log to determine which files have been changed, added or deleted and thus avoid rescanning the entire file system to refresh indexing databases. Data replication products can also use the file change log to determine files to synchronize on replicated nodes during system recovery.

The file change log is accessible for reading as an ordinary sparse file in the file system, not as a hidden or system file. The file change log tracks selected changes to files in the file system. The size of the sparse file can be limited by configurable variable values set by the system administrator. Because the file change log is exposed as an ordinary file, some regular file operations by applications on the FCL file are prevented to protect the file change log data.

The types of changes to be tracked and logged by the file change log include selected changes to file information (metadata), links to the file, and attributes of the file, as well as file creation and removal. An indication that data in a file have changed is recorded, although copies of the data showing pre-change data and post-change data are not.

Features of the file change log include the following:

Robust across system crashes

Improved performance for applications

Negligible or minimal performance effect on file system and operating system

Easy to access

Simple administrative interface

Tracks type and time of changes

Available across Network File System (NFS)

Sets a minimum elapsed time that records remain in the log

In one embodiment, the file change log grows continuously, although allocated storage for the file can be limited by administrator-configurable variable values. In order to support both clones of file systems and multiple, independently mountable filesets within a file system, one file change log is used for each fileset other than the file system's structural fileset.

Creation of the File Change Log

The file change log is created when file system change tracking is activated. The file change log is accessible for read access as an ordinary file in the file system, not a system or hidden file. Applications can read the file change log using a file system-independent operating system function. Using a file system application programming interface (API) is not necessary to access the file change log data. Additional space can be allocated to the file change log on an as-needed basis. Allocation of additional space for the file change log is described further in the "Maintaining the Size of the File Change Log" section of this document.

To preserve the integrity of the file change log, the file system maintains the file change log's data, name, and location. Applications can read the file change log, but certain other operations are disallowed. For example, applications are prevented from writing to, renaming, and deleting the file change log. Furthermore, applications are prevented from mapping the file change log into memory (performing an mmap( ) operation). In effect, file operations by applications are prevented that modify the FCL file itself or change data in the file change log. These concepts are described further with regard to FIGS. 1, 2 and 3 below.

FIG. 1 is a flowchart showing an example, of a method for processing of file system operations by a file system. In "Receive OS Call" step 110, the file system receives an operating system call to perform a read, write, or other operation. In "Determine Target File for Operation" step 120, the target file of the operation is determined. At "FCL" decision point 130, a determination is made whether the target file is the file change log. If the target file for the operation is the file change log itself, control proceeds to "Process Change to FCL" step 140, and the method ends. "Process Change to FCL" step 140 is described in further detail with reference to FIG. 2.

At "FCL" decision point 130, if the target file for the operation is not the file change log, control proceeds to "Operation on Parent Directory of FCL" step 150. This check is made because, while the FCL itself may not be the direct target of the operation, a directory can be. At "Operation on Parent Directory of FCL" step 150, a determination is made whether the operation is on the parent directory of the file change log. If so, control proceeds to "Determine Target File in Parent Directory" step 160, where a determination of the target file within the parent directory is made. At "FCL Target" decision point 170, if the file change log is the target file, control proceeds to "Process Change to FCL" step 140. If the file change log is not the target file, control proceeds to "Process Change to File" step 180, and the method ends.

Figure 2:
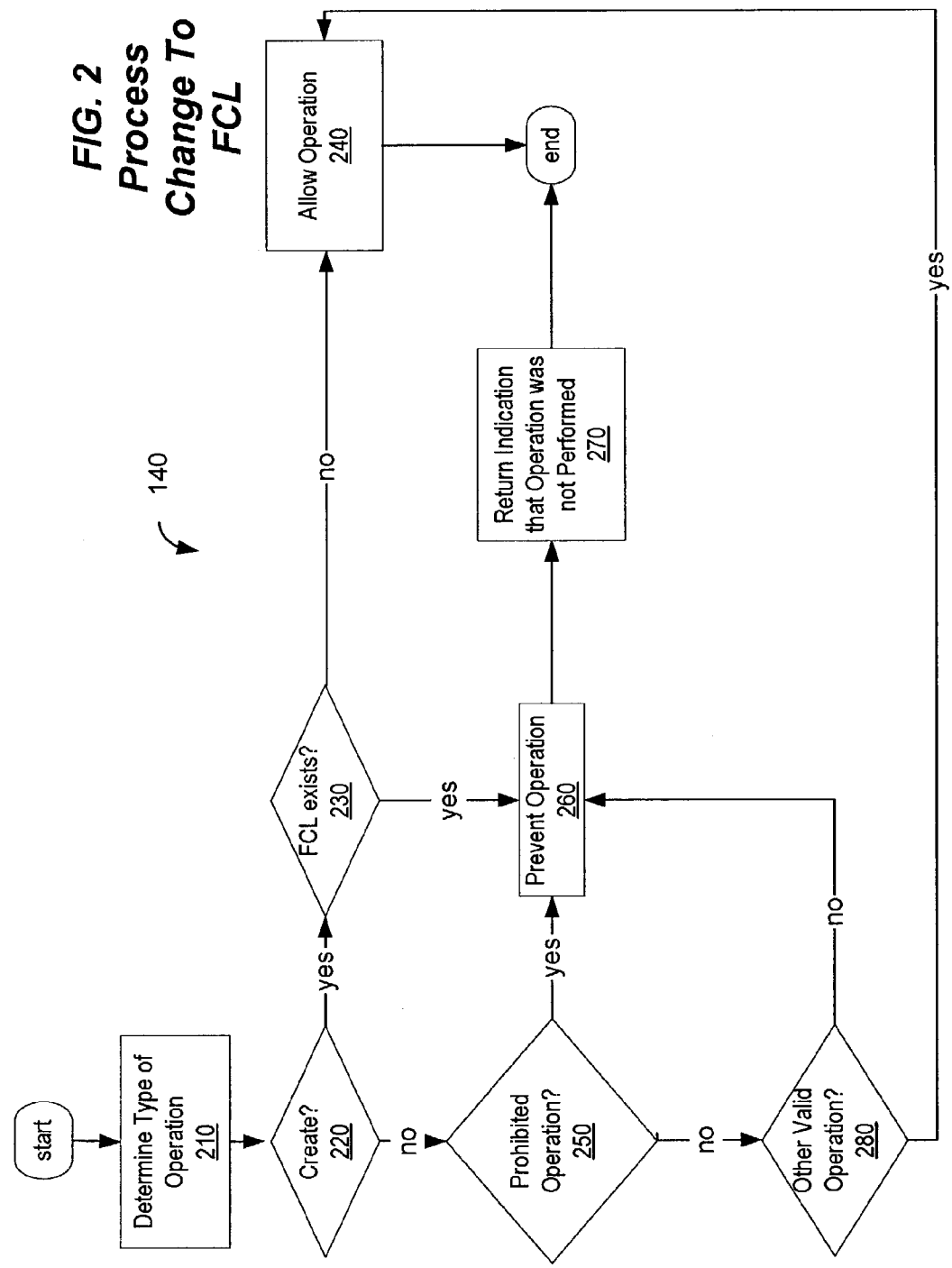
FIG. 2 is a flowchart showing an example of a method for processing a change to the file change log requested by an application.

FIG. 2 is a flowchart showing an example of a method for processing a change to the file change log requested by an application. In "Determine Type of Operation" step 210, the type of operation to be performed on the file change log is determined. Control then proceeds to "Create" decision point 220, where a determination is made whether the operation is to create the file change log. If so, control proceeds to "FCL Exists" decision point 230. If the file change log does not exist, control proceeds to "Allow Operation" step 240 and the method ends. If the file change log exists, control proceeds to "Prevent Operation 260." Creation of the file change log is prevented because the file change log already exists.

From "Prevent Operation" step 260, control proceeds to "Return Indication that Operation was not Performed" step 270. An indication that the operation was not performed is returned to the requesting application program, and the method ends.

At "Create" decision point 220, if the operation is not to create the file change log, control proceeds to "Prohibited Operation" decision point 250. Here, a decision is made whether the requested operation is prohibited by an application, such as a rename or delete of the file change log. If the operation is prohibited, control proceeds to "Prevent Operation" step 260 and continues as described above. If the operation is not prohibited, control proceeds to "Other Valid Operation" decision point 280.

If at "Other Valid Operation" decision point 280, a determination is made whether another valid operation has been requested by the calling application program. If so, control proceeds to "Allow Operation" step 240. If not, control proceeds to "Prevent Operation" step 260 and continues as described above.

Figure 3:
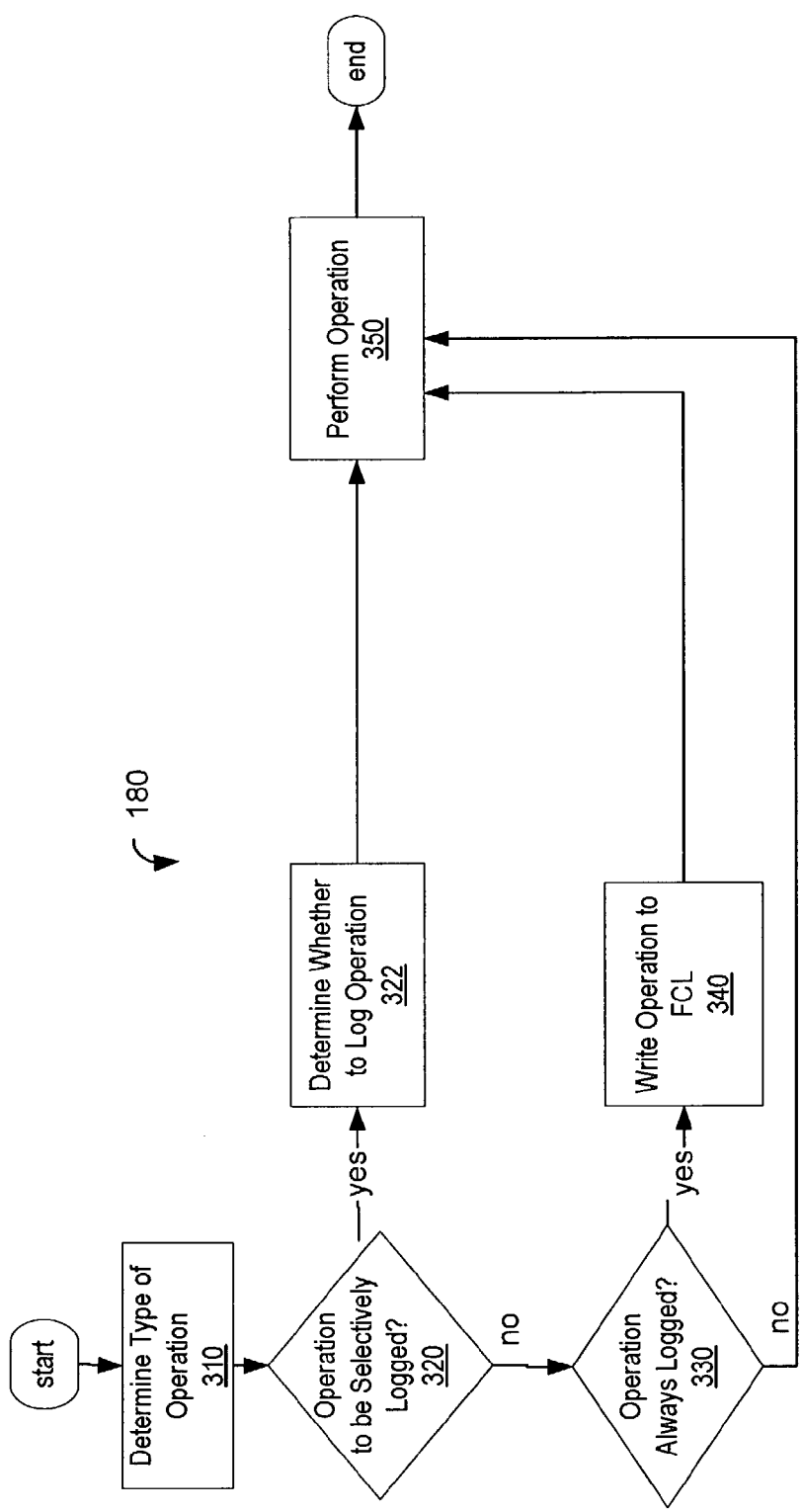
FIG. 3 is a flowchart showing an example of a method for processing a change to a file in the file system requested by an application.

FIG. 3 is a flowchart showing an example of a method for processing a change to a file in the file system (other than the FCL file itself) requested by an application. At "Determine Type of Operation" step 310, a determination of the type of operation to be performed is made. Control then proceeds to "Operation to be Selectively Logged" decision point 320, where a determination is made whether the operation is to be logged.

If the fact that data have been changed within the file has already been recorded in the file change log within a pre-specified time period, an additional entry in the file change log to record that the file has changed again would be duplicative. Contents of the file are not tracked in the file change log, only the fact that the file has changed. In one embodiment, an administrator can classify operations into categories indicating whether the operation is to be written to the file change log. For example, operations such as writes, appends, and truncations can be written to the file change log selectively, i.e., only once during a given time period. Subsequent writes, appends, and truncations can be performed without subsequent records being written to the file change log until the given time period elapses. In such a case, write, append, and truncation operations can be classified as operations to be selectively logged.

From "Operation to be Selectively Logged" decision point 320, when the operation is classified as an operation to be selectively logged, control proceeds to "Determine Whether to Log Operation" step 322. "Determine Whether to Log Operation" step 322 is discussed further with reference to FIG. 6. Control proceeds from "Determine Whether to Log Operation" step 322 to "Perform Operation" step 350, where the operation is performed.

From "Operation to be Selectively Logged" decision point 320, when the operation is not classified as an operation to be selectively logged, control proceeds to "Operation Always Logged" decision point 330. If the operation is always to be logged, control proceeds to "Write Operation to FCL" step 340. If the operation is not always to be logged at "Operation Always Logged" decision point 330, then the operation is neither being selectively logged or always logged, and thus is not logged. Control proceeds to "Perform Operation" step 350.

In one embodiment, static information for the file change log is stored in a superblock for the file change log. The superblock resides in the first block of the file change log at offset zero. Applications are expected to read the first block each time the file change log is opened for read access to obtain structural information about the file change log.

In one embodiment, the superblock includes the following data fields:
- a magic number,
- a version number,
- a state of the file change log,
- a synchronization count,
- an activation time, and
- a first valid offset indicating a location from which the first valid record can be read.

The magic number field contains a value that is unlikely to turn up by chance and is used to indicate that the file containing the superblock is the FCL file. The version number field indicates a version number for the file change log.

The state field indicates whether the file change log is enabled or disabled. The FCL state can be used, in conjunction with the activation time field described below, by applications to determine whether or not changes may have been missed since the last read of the file change log. When the file change log is activated, the state variable can be set to ON and a new file change log created. Once the file change log is created, extents (contiguous blocks in the file system) are allocated to the file change log, and changes to files in the fileset begin to be logged. Subsequent allocations of extents are discussed in further detail below.

If the FCL state is ON, but other information (such as the activation time field) for the file change log is different, the file change log may have been disabled and re-enabled. In both situations, applications may be unaware of changes in the file system that occurred in the interim. If an application has missed changes to the file system, the application may need to rescan the entire file system to establish a new baseline from which changes are tracked.

If the FCL state is OFF, the file change log is empty, space allocated to the file change log has been freed, and changes to the file system are not being logged. The synchronization count field is related to the frequency with which data write records are written to the file change log. The synchronization count field is explained in further detail below.

The activation time field indicates the time that the file change log was activated and can be used by an application to determine that the file change log was disabled and re-enabled after the application last read the file change log. In such a case, the application has missed data since the last read of the file change log and should establish a new baseline from which to track changes.

The first valid offset field indicates a location in the file change log from which to begin reading. This offset information is provided because the file change log is a sparse file, and records can be deleted from the beginning of the file. When records are deleted from the beginning of the file, no log records exist from the beginning of the file change log to the offset location; a "hole" has been punched in the file. In another embodiment, a last valid offset field is also included to indicate a location in the file change log at which to stop reading.

In one embodiment, the file change log record structure includes the following information:
- a change type,
- a next record type,
- an identifier for the file changed,
- a timestamp for the change,
- a generation count, and a file name length. (A file change log record having a value for the file name length is followed by record(s) containing the file name.)

In this embodiment, a reverse name lookup function provides an application with a full path name for the changed file. The reverse name lookup function is used to identify a full path name from the information in the file change log. For example, an application can provide a unique identifier for a file (such as an Mode number in the Unix operating system) to the reverse name lookup function. The reverse name lookup function returns a full path name for the file.

In another embodiment, for operations such as a file rename or delete, the file change record includes a name of the file being renamed or deleted and an identifier uniquely identifying the directory in which the changed file resides, such as an Mode number of the directory. The unique directory identifier is provided in addition to the identifier for the file. Using the file name and the file and directory identifiers, an application can construct a full path name for the file, as opposed to the file system performing the reverse name lookup function. In both embodiments, the file change record is limited to 32 bytes, with full path names and file names following a rename or delete record. A file name is limited to 256 bytes on most UNIX systems, and path names are limited to 1024 bytes on most UNIX systems. Each of the fields in the example of the file change log record provided above is described below.

The change type field value can indicate one of the following types of changes:
- file information (metadata) change
- file create
- file link
- file delete (This operation deletes the file. The terms 'delete,' unlink,' and 'remove' are used interchangeably herein, as different file systems may use different terminology for deleting a file.)
- file rename (This operation renames or moves the file. The terms 'rename' and 'move' are used interchangeably herein).
- file undelete
- file data append
- file data overwrite
- file data truncate
- file extended attribute change
- file hole punched (indicates that data have been deleted in the file to make room for additional data)

The next record type field is used to indicate when a file name record follows (as when a rename or delete operation has been performed). Not all operations on a file require that a file name be written to the file change log; for example, the identifier of the file may be sufficient when the data in the file are updated. The timestamp field indicates the time at which the file described in the file change log record was changed.

The generation count variable is used for file systems that allow a unique file number to be re-used when the file is deleted. Such systems include file systems running under the Unix operating system, in which a unique number for the file, called an inode number, is re-used. The file generation count variable indicates whether the current instance of the file identified by the unique file identifier is the file for which the file change record was written.

In one embodiment, a header file for the file change log contains publicly-available data needed by applications to build and/or interpret file change log records. Contained in the header file are the types of changes included in the file change log, the file change log superblock data structure, the file change log record structure, and various variable definitions.

In one embodiment, administrator-configurable variables are provided to enable an administrator to "tune" the file change log to perform efficiently within the specific application environment for which changes are tracked. These variables include a write interval variable, indicating a minimum length of time between recording data changes to a file in the file change log; a maximum allocation variable, determining a maximum allocation of storage space for the file change log; a "keep time" variable, providing a length of time to keep records in the file change log before removing them; and a delete size variable, indicating the amount of space to be freed by deleting records when the FCL file itself becomes full. Deleting records to make room for other records is also referred to as "punching a hole" in the file, and the delete size variable is also referred to as a "hole size" variable.

In one embodiment, the following commands can be performed by an administrator:
- felon—activate (and create if necessary) the file change log
- fcloff—deactivate the file change log and truncate to one block size (to contain information in the superblock described above)
- fclstate—return state of file change log (on or off)
- fclrm—remove the file change log
- fclsync—increment and return the current last valid read offset in the file change log
- fcloffset—return the offset within the file change log from which to begin reading (continuing to the end of the file change log). If the offset is zero, the file change log superblock data is returned.

To determine the offset in the file change log from which to read the file change log records, applications can first read the superblock found at offset zero of the file change log and then read the current last valid read offset information described above. Each record in the file change log indicates a change to a file in the file system.

Reading the File Change Log

In one embodiment, a copy of the file change log is maintained in memory and periodically flushed to disk. Consequently, records are written to and read from the in-memory version of the file change log. A check is made in the read( ) code to determine whether the file change log is being read. If so, the read operation is redirected to the in-memory version of the file change log instead.

In one embodiment, the file change log is a sparse file and file change records may not fill the entire space allocated for the file change log. To prevent applications from reading beyond the end of valid records in the file change log, a "last valid read offset" can also be maintained, for example, in the file system in memory. Applications are expected to read the last valid read offset before reading the file change log, and to read only records between the first and the last valid read offsets. Reads of the file change log are checked for attempts to read beyond the last valid read offset, and such attempts to read beyond the offset can be prevented. Applications can store the last valid offset read for each time the application reads the file change log. In subsequent reads, the application can begin reading the file change log from that point.

Figure 4:
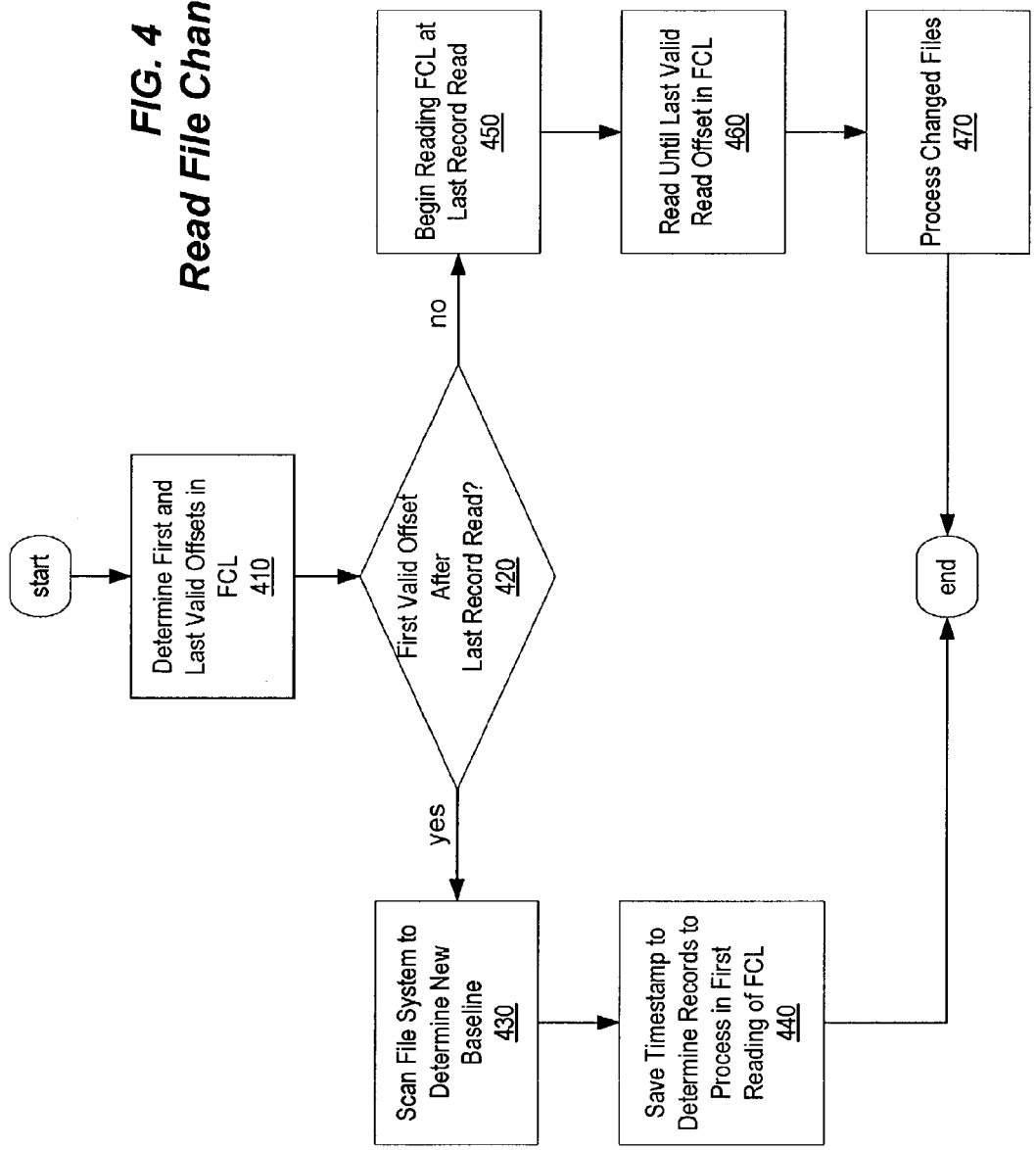
FIG. 4 is a flowchart showing an example of a method for reading the file change log.

FIG. 4 is a flowchart showing an example of a method for reading the file change log by an application. In "Determine First and Last Valid Offsets in FCL" step 410, the application obtains the first and last valid offsets for the file change log. Only records between the valid offsets can be read by the application, as the file system will prevent reading data prior to the first valid offset or after the last valid offset. Control then proceeds to "First Valid Offset After Last Record Read" decision point 420. If the first valid offset is after the last record in the file change log that was read by the application, the application may have missed some records written to the file change log. In such a situation, the safest course is to rescan the file system, as shown in "Scan File System to Determine New Baseline" step 430.

Control proceeds from "Scan File System to Determine New Baseline" step 430 to "Save Timestamp to Determine Records to Process in First Reading of FCL" step 440. The timestamp for the time that the file system was scanned is recorded so that records from the file change log before that timestamp can be discarded. Those records are already captured in the scan of the file system and should not be processed again.

If at "First Valid Offset After Last Record Read" decision point 420, the first valid offset is not after the last record in the file change log that was read by the application, the application can begin reading the file change log. Control proceeds to "Begin Reading FCL at Last Read Record" step 450, where the file change log is read beginning at the last record read by the application, or, in the case where the file system was just re-scanned, at the beginning of the file change log. Control proceeds to "Read Until Last Valid Offset in FCL" step 460 to obtain all records in the file change logs. Based upon the information found in the file change log, the application can process the changed files, as shown in "Process Changed Files" step 470.

Writing to the File Change Log

Records are written to the file change log asynchronously as atomic transactions. A record of a change is received in memory, written to a file system intent log, and later committed to disk. The process of writing to the file change log is explained further with reference to FIG. 5.

Figure 5:
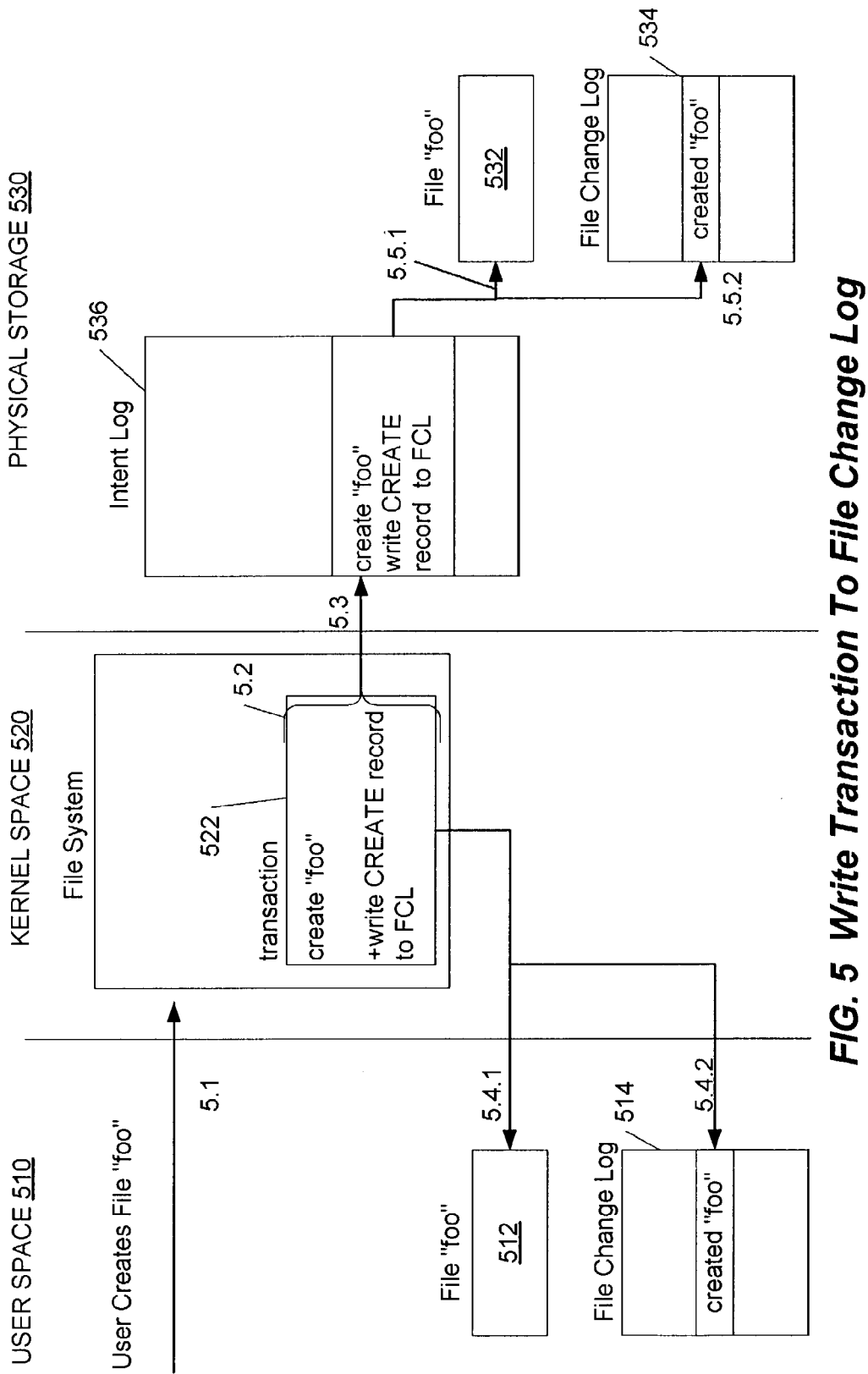
FIG. 5 is a diagram showing an example of a method for writing a record to the file change log.

FIG. 5 shows writing a record to the file change log, which is an operation performed by the file system and not by applications. Actions performed in sequence at three locations are described, with the three locations corresponding to user space 510, kernel space 520, and physical storage 530. Kernel space 520 includes file system memory in this example. In action 5.1, a user creates a file named "foo." The term 'user' as used herein includes both human users and application programs that use files in the file system. In action 5.2, transaction 522 is written to file system memory in kernel space 520. Transaction 522 includes a create (file) "foo" command and a write command to write a create operation record in the file change log 534 in physical storage 530.

In action 5.3, transaction 522 is written to intent log 536 in physical storage 530. In actions 5.4.1 and 5.4.2, in-memory versions of the file change log and the file are provided for viewing by the user. The user can view file "foo" 512 and file change log 514 as if the transaction were complete, when in fact the changes to the file change log and to the file have not yet been committed to physical storage 530. However, the transaction has not yet been committed to physical storage in the file or file change log. After actions 5.4.1 and 5.4.2 are completed, actions 5.5.1 and 5.5.2 are performed. Actions 5.5.1 and 5.5.2 show the physical file "foo" 532 and file change log 534 being written to physical storage 530, after the application has already read the file change log 514 as provided from memory.

In one embodiment, the file change log is read from and written to a buffer cache that caches data in memory, whereas files other than the FCL file are read from and written to a page cache. Records in the file change log are appended rather than overwritten, so that simultaneous write operations are not written to the same location in the FCL file. As a result, the buffer cache buffer(s) being written can be shared, rather than locked in exclusive mode, when a file change log record is written. By allowing the buffer cache buffers to be shared, updates of the file change log can be written in parallel. The file system can write to the file change log more efficiently than would be the case if updates were written to the buffer cache buffers one at a time.

Furthermore, rather than writing the buffer cache buffers directly, a small set of memory buffers can be linked to the file change log record structure, thereby expanding the size of the file change log for access by multiple applications. These memory buffers represent the current area of the FCL file being written. Newly allocated extents to increase the FCL file size do not need to be cleared, and therefore performance of writing to the file change log is improved.

Before writing a record to the file change log, an offset in the file change log to write the record can be assigned. In one embodiment, the offset is assigned after the write transaction is in the commit phase of writing the intent log 536 to physical storage 530. The transaction commit phase should not fail unless the underlying hardware fails. Once the offset has been assigned, the last valid read offset is incremented by the size of the FCL record being written.

Once an offset in the FCL file is assigned to receive the file change log record, the transaction can be linked to the memory buffer location and the file change log data written into the memory buffer. The memory buffer is available for read and shared write access during this time. The last valid read offset is updated to reflect the last file change log record within the memory buffers that are contiguous with the rest of the FCL file.

Holes may appear within the memory buffers as different file change log records are written to different locations in the memory buffers. As the holes are filled, the memory buffer can be traversed and the "last valid read offset" set to the beginning of the next "hole" in the file change log without records. When an application reads the file change log and some of the file change log records within the last valid read offset are still in the memory buffers, these records can be read directly from the memory buffers. Applications can therefore read up to the last valid read offset.

Once the last valid read offset has reached the end of a memory buffer, that memory buffer can be released as a delayed write buffer. Delayed write buffers are written to disk and provide a permanent disk version of the file change log. This embodiment provides better performance than an embodiment that locks the memory buffers when the transaction updating the file change log begins, as opposed to after the transaction is committed to the intent log.

Each time the file change log is written, the FCL file size and timestamps can be updated. To increase performance, updates to the FCL file size and timestamps can be limited to operations that add or remove extents from the FCL file.

Some operating systems support overriding an ordinary operating system call with a file system-specific function that performs the same operation as the operating system call. For example, an operating system read( ) function in Unix can be overridden by a file system read function that reads a file in a given file system using a virtual node ("vnode") command interface. To access a particular file system, an application makes an operating system function call, which is translated into a vnode interface call. The Unix vnode command interface provides generic abstract file system operations to support multiple file system implementations.

In one embodiment, a command interface overrides selected system functions performed by an operating system call that modify the FCL file itself, including file change log data. Examples of these functions are write, memory mapping (mmap), rename, and delete (unlink/remove) functions. Rather than perform a write or memory mapping operation by an application on the file change log, this command interface returns an indication that the write or mmap call was not performed, as applications are not allowed to write to or perform a memory mapping operation on the file change log.

Since deletions and renames operate on the parent directory rather than the file change log itself, the file to be deleted or renamed within the parent directory is first identified. The file system checks whether the file being deleted or renamed is the file change log and, if so, returns an indication that the delete or rename function was not performed. A similar check in the create( ) system call disallows the creation of a file having the same name as the file change log if the FCL file already exists. One of skill in the art will recognize that the command interface described above is one embodiment that is based upon the Unix vnode interface. Other embodiments may use other means of overriding operating system calls.

Changes associated with actual writes to data on disk are handled as a special case, since file system performance would be affected by writing each occurrence of a file data write to the file change log. As long as all applications reading the file change log can reliably determine that a file has been updated at least once since the last time the application read the file change log, individual records of data changes are not necessary for the file change log.

Because no record of an old file name is retained in a file system after the file has been deleted or renamed, the "file rename" and "file unlink" change types can record the fact that a file name has changed or that a file had been unlinked (deleted), along with the old name of the file. The old name of the file is written into the log directly after a record of type "file rename" or "file delete" is written to the log. The old name can include the full pathname of the file relative to root before the name change and can be up to MAXPATHLEN long (which is 1,024 bytes on most systems). The name is 32-byte aligned, which is the size of a file change log record.

Since file names can be of variable length, a file name can cross a sector boundary. File names spanning sector boundaries can cause a problem when records are deleted to make room for other records in the file change log. The first blocks in the log (i.e., the tail of the log) could potentially be a part of a file name. In one embodiment, to avoid this problem, a file change log record of the type "sector header" is written as the first record in a sector when the first record in that sector is a file name. The sector header change type record includes a change type field and the next record type field. In the event that the file name begins directly after the sector header, the next record type field is set to "file name start." If the file name being written to the file change record crosses a sector boundary, the next record type field is set to "file name continued." When a file name crosses a sector boundary, a sector header record can be written inside the file name string (at the head of the sector). Applications reading the file change log must be able to interpret the sector header record in the middle of the file name string.

The frequency of writing the "file data append," "file data overwrite," and "file data truncate" records can be determined by a timeout (corresponding to the FCL write interval variable) or by an application synchronization point. The application synchronization point (FCL sync count) method is described further with reference to FIG. 6, and the timeout (FCL write interval) method is described further with reference to FIG. 7.

Figure 6:
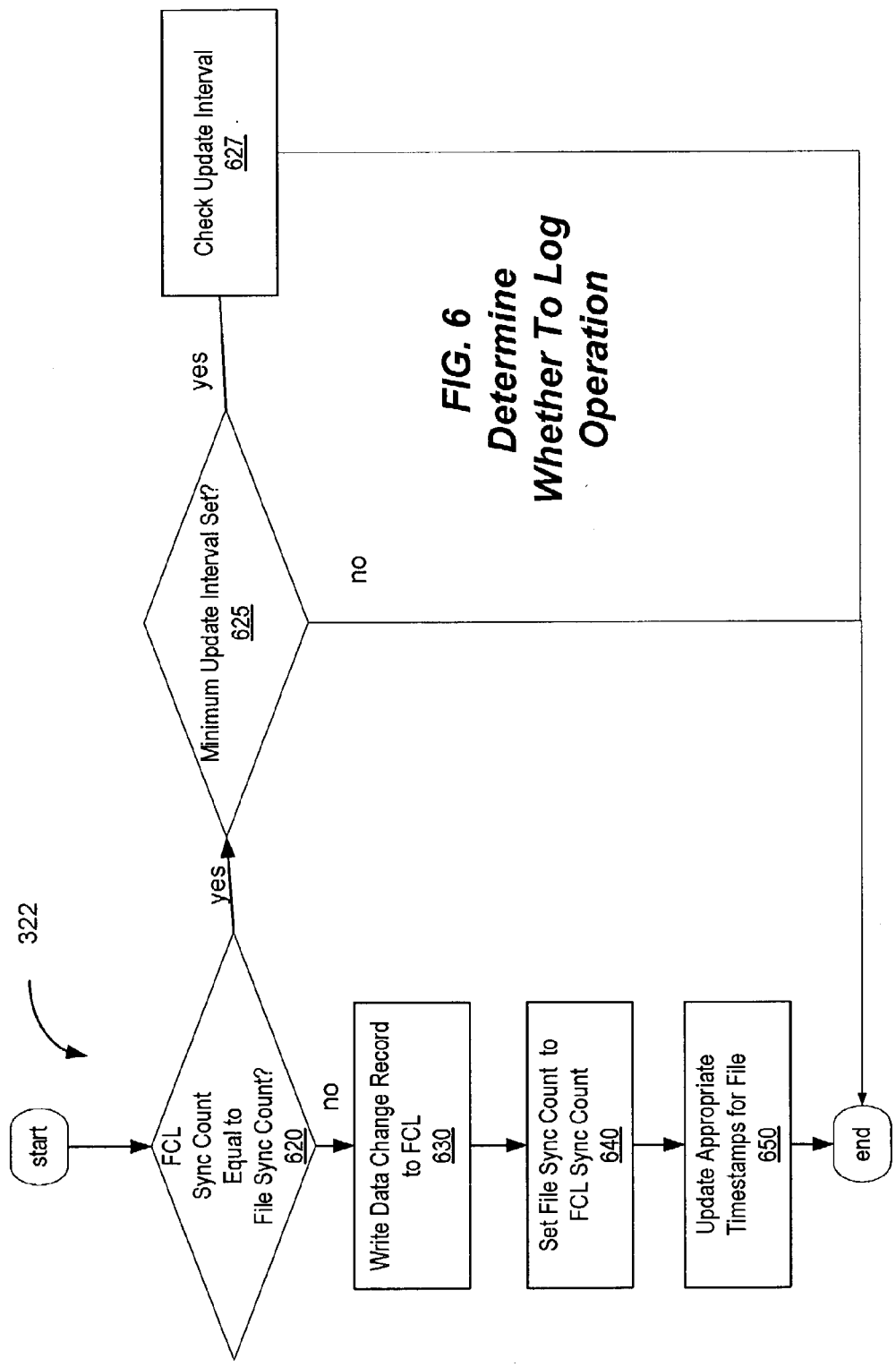
FIG. 6 is a flowchart showing an example of a method for determining whether to write a record to the file change log for a given operation.

FIG. 6 is a flowchart showing an example of a synchronization count method for controlling the number of "data write" records written to the file change log. FIG. 6 provides an example of one implementation of "Determine Whether to Log Operation" step 322 of FIG. 3. In the embodiment shown in FIG. 6, an FCL sync count is kept in the file change log superblock and a file sync count is kept in memory associated with each file's unique identifier. When these two values are not equal, a synchronization is performed. One of skill in the art will recognize that the use of synchronization variables is an example of one method to determine whether to log an operation, and that other techniques can be used in accordance with an organization's particular data needs.

At "FCL Sync Count Equal to File Sync Count" decision point 620, a determination is made whether the FCL sync count is equal to the file sync count. If the two are not equal, the file change log should be updated, and control proceeds to "Write Data Change Record to FCL" step 630, where a record for an operation indicating a data change to the file is written to the file change log. Control proceeds to "Set File Sync Count to FCL Sync Count" step 640, where the file sync count is synchronized with the FCL sync count by setting the file sync count value to the value of the FCL sync count. Control then proceeds to "Update Appropriate Timestamps for File" step 650, where the appropriate timestamp, such as a "data appended" timestamp, is updated. Other examples of timestamps for a file include a "data write" timestamp and a "data truncated" timestamp.

If at "FCL Sync Count Equal to Sync Count" decision point 620, the FCL sync count is not greater than the file sync count, then an operation of the current change type (i.e., append, write, or truncate) has already been recorded in the file change log. In one embodiment, data write records are recorded selectively to reduce overhead in writing to the file change log.

If at "FCL Sync Count Equal to Sync Count" decision point 620, the FCL sync count is not greater than the file sync count, control proceeds to entry point "Minimum Update Interval Set" decision point 625. As mentioned previously, two variables are tracked within the example superblock provided above, an FCL write interval variable and an FCL synchronization count variable. One or both of these variables can be set. If at "Minimum Update Interval Set" decision point 625, a minimum update interval (e.g., FCL write interval) is set, control proceeds to "Check Update Interval" step 627. When the update interval has been checked and processing performed accordingly (as further described with reference to FIG. 7), determining whether the operation is to be logged is completed and any records to be written to the file change log have been written. At the endpoint of the flowchart for FIG. 6, control returns to "Determine Whether to Log Operation" step 322 of FIG. 3, and proceeds to "Perform Operation" step 350, where the operation is performed, as described above.

If at "Minimum Update Interval Set" decision point 625, no minimum update interval (e.g., FCL write interval) is set, control proceeds to the endpoint for the flowchart of FIG. 6. Control returns to "Determine Whether to Log Operation" step 322 of FIG. 3, and proceeds to "Perform Operation" step 350, where the operation is performed, as described above.

The timeout method tracks changes according to an FCL write interval. The FCL write interval can be maintained in the file change log superblock. In one embodiment, each file has three timestamps, corresponding to the following change types: file data append, file data write, and file data truncate.

In one embodiment of the file change log, timestamp values are not saved each time data are changed. Instead, the three timestamps are maintained in memory associated with a file identifier for a corresponding file. These timestamps are initially set to zero so that the first data write record of each type (append, overwrite, truncate) is recorded.

When doing a write operation on a particular file, the timestamp for the appropriate data write operation for that file is checked. The timestamp indicates a need to update the file change log when the time elapsed between the current write operation and the timestamp is greater than the value of the FCL write interval or the timestamp has been reset to zero to trigger writing additional data write records. A file change log record is written and the timestamp associated with the file identifier is reset to the current time. This new timestamp therefore records the last time that a data write operation of this change type for this file was written to the file change log. The timestamp can be used to avoid writing additional data write records of the same change type for the file until the FCL write interval has elapsed. The file change log record is written as an asynchronous transaction.

Figure 7:
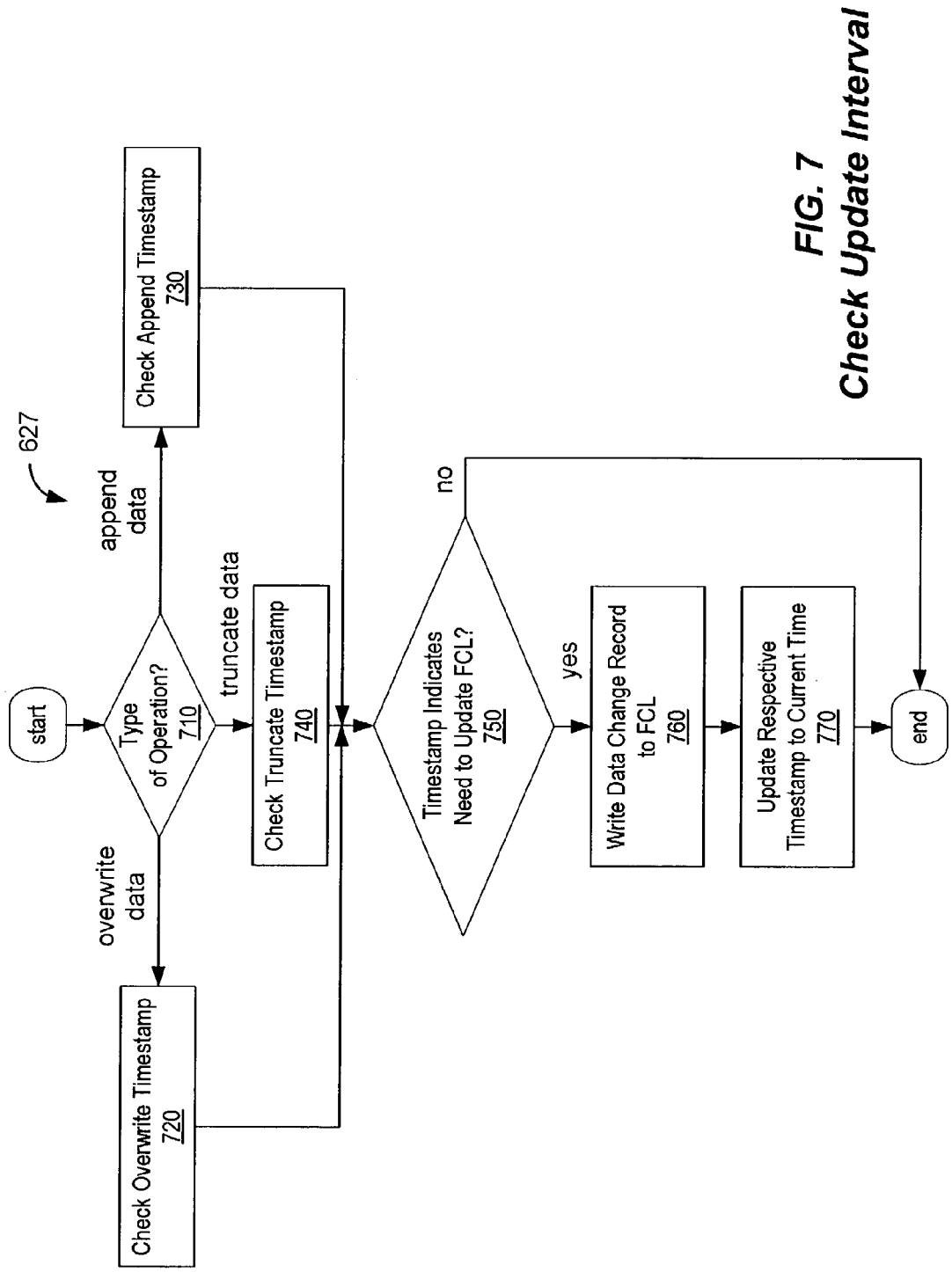
FIG. 7 is a flowchart showing an example of a write interval method for controlling the number of "data change" records written to the file change log.

FIG. 7 is a flowchart showing an example of a write interval method for controlling the number of "data write records," also referred to herein as "data change records," written to the file change log. FIG. 7 corresponds to "Check Update Interval" step 627 of FIG. 6, but the process of checking the update interval is not limited to a preliminary check of the FCL synchronization count variables as described with reference to FIG. 6. The process described in FIG. 7 may be performed as part of "Determine Whether to Log Operation" step 322 of FIG. 3, either alone or in conjunction with the synchronization method described with reference to FIG. 6.

The update interval can be checked when a data change record may be written to the file change log. At "Type of Operation" decision point 710, a determination is made regarding the type of operation being performed. If the operation is an "overwrite data" operation, control proceeds to "Check Overwrite Timestamp" step 720; if the operation is an "append data" operation, control proceeds to "Check Append Timestamp" step 730; and if the operation is a "truncate data" operation, control proceeds to "Check Truncate Timestamp" step 740.

From each of steps 720, 730, and 740, control proceeds to "Timestamp Indicates Need to Update FCL" decision point 750. As described above, if the current time minus the respective timestamp exceeds the FCL write interval or the timestamp has been reset to zero, then a record should be written to the file change log. Control proceeds to "Write Data Change Record to FCL" step 760 and continues to "Update Respective Timestamp to Current Time" step 770, and processing the current operation is complete. If the timestamp does not indicate the need to update the file change log in "Timestamp Indicates Need to Update FCL" decision point 750, then the current operation has already been recorded within the write interval. Processing the current operation is complete and control proceeds from "Check Update Interval" step 627 as described with reference to FIG. 6. In the alternative embodiment described above when synchronization of FCL and file sync count variables is not used, control can proceeds from "Determine Whether to Log Operation" step 322 of FIG. 3.

The FCL write interval limits the number of duplicative writes to the file change log, while still providing a guarantee that the writes are written frequently enough to meet the needs of the applications using the file change log. The FCL write interval is typically much smaller than the time that the file system guarantees that file change log records will be available in the file change log.

It may be desirable for some applications to capture all writes to files after a particular point in time. Therefore, an application may read the file change log at more frequent intervals than the file system writes data change records to the file change log, depending upon the value of the FCL write interval variable. For example, the file system may be preventing the addition of data change records for data changes to a given file because one data change record for that file has already been added during the FCL write interval. The log_sync function overcomes this problem by triggering the file system to allow additional data write records to be added before the FCL write interval expires.

Figure 8:
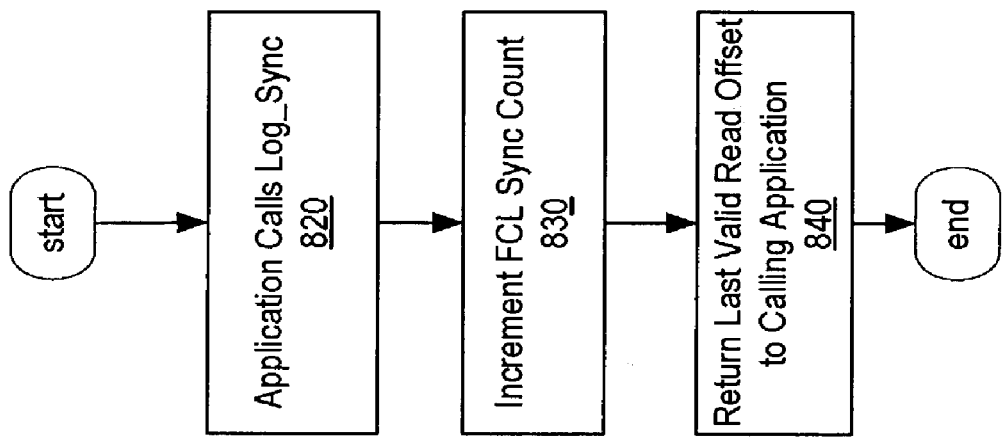
FIG. 8 is a flowchart showing an example of a method for an application to control the frequency of writing records to the file change log.

FIG. 8 is a flowchart showing an example of a method for an application to control the frequency of writing records to the file change log. To trigger writing records to the file change log, the application calls the log_sync function, as shown in "Application Calls Log_Sync" step 820.

The call to the log_sync function increments the FCL sync count, as shown in "Increment FCL Sync Count" step 830. In addition, the operation may be logged in the file change log. The current "last valid read offset" at the time the log_sync call was made is returned to the calling application in "Return Last Valid Read Offset to Calling Application" step 840. The calling application can use the last valid read offset to begin reading at that point in the next read of the file change log or for other purposes.

FIG. 9 shows an example scenario of updates to the file change log, respective files' sync counts, and the FCL sync count. In Event 9.1, the computer system that will host the file change log is booted. In Event 9.2, the file change log is activated and FCL sync count is set to 0. In Event 9.3, file F1 is created and F1 sync count is set to 0. In Event 9.4, file F2 is created and F2 sync count is set to 0. In Event 9.5, the log_sync function is called and FCL sync count is set to 1.

In Event 9.6, data are written to file F1, and F1 sync count is updated to have a value of 1. This event triggers a data change record to be written to the file change log. In Event 9.7, log_sync is called again and FCL sync count is set to 2. In Event 9.8, data are written to file F2, and F2 sync count is updated to have a value of 2, matching the value of FCL sync count. Again, a data change record is written to the file change log. In Event 9.9, data are written to file F2 again. F2 sync count is not updated because the value of FCL sync count equals the value of F2 sync count. Unless the FCL write interval has elapsed, a data change record is not written to the file change log. In Event 9.10, log_sync is called again and FCL sync count is set to 3. Additional updates continue to follow this pattern, and the FCL sync count continually grows larger. FCL sync count is reset to zero when the file change log is disabled and activated again.

As with the FCL write interval method, use of the FCL sync count causes the next incoming data write record to be written. Data write records are written as an asynchronous transaction. When the file sync count is updated, the timestamp for the corresponding write operation (append, overwrite, or truncate) is set to the current time. The timestamps for the other two data change types for the file can also be reset to the zero so that the file system records the next data write of each type of write operation in the file change log.

When only one application is reading the file change log, and that application consistently calls the log_sync function, the system administrator can tune the FCL write interval to a long period or time or turn off the FCL write interval completely. These adjustments provide the single application using the file change log complete control over the frequency of data write records in the file change log. When multiple applications are using the file change log, each application that issues a log_sync call increments the FCL sync count and causes data write records to be logged again. In such a situation, more instances of data write records for a particular file are likely to be written, but many fewer records will be written than if every write to data were recorded in the file change log.

Using either or both of the FCL write interval and FCL sync count methods, the first time data are written to a file, a data write record is logged in the file change log. Therefore, the opening of a file to write data or to perform a memory mapping of a file need not be logged. In one embodiment, open file operations are not recorded in the file change log.

Maintaining the Size of the File Change Log

While records can be appended to the FCL file indefinitely, the underlying storage used by the FCL file can be allowed to grow in size only until one or more of the following conditions are met:
   a specified maximum allocation to the file has been reached (FCL maximum allocation),
   a specified amount of time has elapsed (FCL keep time), or
   the file system has run out of space.

Each of the above variables is discussed in further detail below.

The FCL maximum allocation variable sets a limit on the amount of space that can be allocated to the FCL file. When the maximum allocation is reached, the oldest file change log records are deleted. In one embodiment, records are deleted from the file change log by "punching a hole" in the file change log to delete the oldest records.

The FCL keep time variable indicates a minimum amount of time that file change log records are guaranteed to be in the file change log, unless the file system first runs out of space. File change log records that have existed in the file change log longer than the minimum time specified can be deleted from the file change log. A determination whether records have been missed by an application uses the FCL maximum allocation variable.

When the FCL maximum allocation is greater than the current allocation for the file change log, extents can be added to the FCL file until the maximum allocation value is reached. If the FCL maximum allocation is reached before the FCL keep time value is reached, file change log records may be deleted to remain within the maximum allocation before an application has the opportunity to read those records. If the FCL maximum allocation variable is not set, the file change log can continue to grow large enough to contain all file change log records written within the minimum time specified, unless the file system runs out of space.

As an optimization, rather than deallocating the blocks in the newly freed space and then reallocating blocks for records to be appended to the end of the file, the freed extents can be moved to the end of the FCL. Moving the blocks has the effect of moving the allocation from one end of the file change log to the other end.

Recovery of the File Change Log Upon System Failure

During normal startup of a file system, a file set is mounted. During mounting of a file set, the last block is read from the file change log and mapped to an FCL memory buffer so that the file change log is ready to log changes as files are changed. In one embodiment, the file system mount function checks the FCL state stored in the superblock, activates the file change log if the FCL state is ON (indicating that previous changes to the file system were logged), and leaves the file change log inactive if the FCL state is OFF.

During normal shutdown of a file system, a file set is unmounted. During unmounting a file set, the FCL memory buffers and the file change log superblock (including the FCL sync count) are flushed to prepare for a subsequent mount of the file set. The FCL state of the file change log is not changed during unmounting so that the file change log remains in the same state when the file set is mounted again. For example, if the FCL state was ON when the file set was unmounted, no changes to the file system were missed.

If a system failure occurs, a recovery module (such as Unix fsck) determines whether a full system consistency check must be run to repair a damaged file system. Any changes made to the file system but not recorded in the file change log should be present in the intent log. The recovery module can first attempt to "replay" the intent log to complete pending updates to the file change log. If replaying the intent log is successful, the file change log can be activated when the file set is mounted. If replaying the intent log is not successful, the recovery module may make changes to the file system that are not tracked in the file change log, so the FCL state is set to OFF. The file change log will not be activated when the file system is mounted again.

When the file system is being recovered, the next valid read offset is determined based upon the records being written to the file change log. If no file change log records currently reside in the intent log, the last valid read offset variable value may be stale in the file change log superblock. In this case, the recovery module reads forward from the stale offset and compares timestamps of the file change log records until a disparity is found. At the point that the disparity is found, the head of the log begins. In another embodiment, an "FCL head" record is written each time the last valid read offset is changed, and the recovery module checks for the FCL head record.

The file change log superblock is written to disk whenever an allocation to the FCL file is made or whenever records are deleted in the file change log to make room for additional records (i.e., a "hole is punched" in the file change log).

Advantages of the present invention are many. The file change log provides a significant performance advantage to several types of applications. Backup applications can use the file change log to back up only those individual files that have changed in a file system. Search and indexing services can use the file change log to speed updates to their index databases because the file change log indicates the files that have been removed, added or changed. Currently these types of applications scan the entire file system namespace to find the files that have been removed, added, or changed to update their databases. Replication products can also use the file change log during recovery of a node to synchronize replicated nodes with a primary node from which data are being replicated.

In one embodiment, a file system for performing the present invention includes an updating module to update file change log data to indicate that a change to a file has occurred. The file containing the file change log data can be accessed using a file system-independent operating system function, such as an open, read, seek, or close function. The file system can further include an allowing module to allow access to the file change log data by multiple applications simultaneously. The file system can also include a preventing module to prevent a selected operation to the file change log by an application when the selected operation modifies the file containing the file change log data. One of skill in the art will recognize that the separation of functionality into an updating module, an allowing module, and a preventing module is but one example of an implementation of the present invention. Other configurations to perform the same functionality are within the scope of the invention.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing described embodiments include components contained within other components. It is to be understood that such architectures are merely examples, and that, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing media include recordable media such as floppy disks and CD-ROM, transmission type media such as digital and analog communications links, as well as media storage and distribution systems developed in the future.

The above-discussed embodiments may be implemented by software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably, or remotely coupled to a microprocessor/memory system. Thus, the modules may be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention. Consequently, the invention is intended to be limited only by the scope of the appended claims, giving full cognizance to equivalents in all respects.

What is claimed is:

1. A method comprising:
    updating file change log data to indicate that a change to a file has occurred, wherein
        the file change log comprises a superblock,
        the file is one of a plurality of files in a file system,
        the file change log data comprise a file identifier of the file,
        the file identifier is usable to obtain a full path name for the file from a reverse name lookup function,
        the file change log data are maintained by a first node, wherein the first node implements a first file system,
        the file change log data are accessible using a file system-independent operating system function, and
        the file system-independent operating system function does not vary in accordance with a type of the file system;
    accessing a value in the superblock, wherein the accessing is performed by a second node;
    identifying a portion of the file change log data based on the value; and
    accessing the portion of the file change log data wherein the accessing is performed by the second node, wherein the second node implements a file system other than the first file system.

2. The method of claim 1 wherein
    the file system-independent operating system function comprises one function of a read function, a seek function, and an open file function; and
    an application calls the one function to access the file change log data.

3. The method of claim 2 further comprising:
    allowing access to the file change log data by a plurality of applications simultaneously.

4. The method of claim 2 wherein
    preventing a selected operation to the file change log by an application when the selected operation modifies a first file containing the file change log data.

5. The method of claim 4 wherein
    the selected operation modifies the first file containing the file change log data when the selected operation updates the file change log data.

6. The method of claim 4 wherein
    the file change log tracks changes for one fileset of a plurality of filesets in the file system; and
    a second change log tracks changes to a second fileset of the filesets.

7. The method of claim 4 further comprising:
    allowing access to the file change log for determining whether the file has changed, wherein the determining whether the file has changed does not scan the file system.

8. The method of claim 4 further comprising:
allowing access to the file change log data in a cache memory.

9. The method of claim 8 further comprising:
writing the file change log data to a memory buffer when the cache memory is full, wherein
the accessing the file change log data in the cache memory further comprises accessing the file change log data in the memory buffer.

10. The method of claim 4 further comprising:
adding a first data change record for the file in the file change log when data in the file are first changed; and
preventing addition of a second data change record for the file to the file change log until a file change log write interval has elapsed.

11. The method of claim 10 further comprising:
receiving a request from an application to write the second data change record to the file change log before the write interval has elapsed; and
causing the second data change record to be written to the file change log before the write interval has elapsed.

12. The method of claim 4 further comprising:
writing a record of a name of the file to the file change log prior to renaming the file.

13. The method of claim 4 further comprising:
setting a minimum time period that the file change log data remain in the file change log file; and
preventing deletion of the file change log data until the minimum time period has lapsed.

14. A system wherein the system includes one or more processors, the system further comprising:
updating means for updating file change log data to indicate that a change to a file has occurred, wherein
the file change log comprises a superblock,
the file is one of a plurality of files in a file system,
the file change log data comprise a file identifier of the file,
the file identifier are usable to obtain a full path name for the file from a reverse name lookup function,
the file change log data is maintained by a first node, wherein the first node implements a first file system,
the file change log data are accessible using a file system-independent operating system function,
the file system-independent operating system function does not vary in accordance with a type of the file system;
first accessing means for accessing a value in the superblock;
identifying means for identifying a portion of the file change log data based on the value; and
second accessing means for accessing the portion of the file change log, wherein the second accessing means facilitates accessing the portion of the file change log by a second node, wherein the second node implements a file system other than the first file system.

15. The system of claim 14 wherein
the file system-independent operating system function comprises one function of a read function, a seek function, and an open file function; and
an application calls the one function to access the file change log data.

16. The system of claim 14 further comprising:
allowing means to allow access to the file change log data by a plurality of applications simultaneously.

17. The system of claim 14 further comprising:
preventing means to prevent a selected operation to the file change log by an application when the selected operation modifies a first file containing the file change log.

18. A computer-readable storage medium comprising:
updating instructions to update file change log data to indicate that a change to a file has occurred, wherein
the file change log comprises a superblock,
the file is one of a plurality of files in a file system,
the file change log data comprise a file identifier of the file,
the file identifier is usable to obtain a full path name for the file from a reverse name lookup function,
the file change log data is maintained by a first node, wherein the first node implements a first file system,
the file change log data are accessible using a file system-independent operating system function,
the file system-independent operating system function does not vary in accordance with a type of the file system;
first accessing instructions to access a value in the superblock;
identifying instructions to identify a portion of the file change log data based on the value; and
second accessing instructions to access the portion of the file change log, wherein the second accessing instructions facilitate access to the portion of the file change log by a second node, wherein the second node implements a file system other than the first file system.

19. The computer-readable storage medium of claim 18 wherein
the file system-independent operating system function comprises one function of a read function, a seek function, and an open file function; and
an application calls the one function to access the file change log data.

20. The computer-readable storage medium of claim 18 further comprising:
allowing instructions to allow access to the file change log data by a plurality of applications simultaneously, wherein
the computer-readable medium further stores the allowing instructions.

21. The computer-readable storage medium of claim 18 further comprising:
preventing instructions to prevent a selected operation to the file change log by an application when the selected operation modifies a first file containing the file change log, wherein
the computer-readable medium further stores the preventing instructions.

* * * * *